(12) United States Patent
Cho et al.

(10) Patent No.: US 8,780,737 B2
(45) Date of Patent: Jul. 15, 2014

(54) APPARATUS AND METHOD FOR LOOP-BACK IN WIRELESS COMMUNICATION SYSTEMS

(75) Inventors: Seung-Kwon Cho, Guri-si (KR); Hun-Sik Kang, Daejeon (KR); Sok-Kyu Lee, Daejeon (KR)

(73) Assignee: Electronics and Telecommunications Research Institute, Seoul (KR)

( * ) Notice: Subject to any disclaimer, the term of this patent is extended or adjusted under 35 U.S.C. 154(b) by 252 days.

(21) Appl. No.: 13/333,656

(22) Filed: Dec. 21, 2011

(65) Prior Publication Data
US 2012/0155289 A1  Jun. 21, 2012

(30) Foreign Application Priority Data

Dec. 21, 2010 (KR) .................. 10-2010-0131736
Jun. 16, 2011 (KR) .................. 10-2011-0058696

(51) Int. Cl.
*H04L 12/26* (2006.01)
*H04W 74/08* (2009.01)
*G06F 11/07* (2006.01)

(52) U.S. Cl.
CPC ....... *H04W 74/0808* (2013.01); *G06F 11/0751* (2013.01); *H04L 1/234* (2013.01)
USPC ........................................... 370/249

(58) Field of Classification Search
CPC ........................ H04L 1/243; G06F 11/0751
See application file for complete search history.

(56) References Cited

U.S. PATENT DOCUMENTS

| | | | |
|---|---|---|---|
| 6,253,060 B1 * | 6/2001 | Komara et al. | 455/9 |
| 2004/0208129 A1 * | 10/2004 | Old et al. | 370/241 |
| 2009/0303888 A1 * | 12/2009 | Ariyur et al. | 370/252 |
| 2011/0026411 A1 * | 2/2011 | Hao | 370/249 |

* cited by examiner

*Primary Examiner* — John Blanton
(74) *Attorney, Agent, or Firm* — H.C. Park & Associates, PLC

(57) ABSTRACT

Disclosed is a loop-back apparatus in wireless communication systems, including: an MAC processing unit configured to transmit a user data and a control frame when a loop-back mode is established; a loop-back unit configured to generate a response frame of a receipt for the user data and the control message transmitted from the MAC processing unit and again feedbacks the generated response frame to the MAC processing unit.

20 Claims, 3 Drawing Sheets

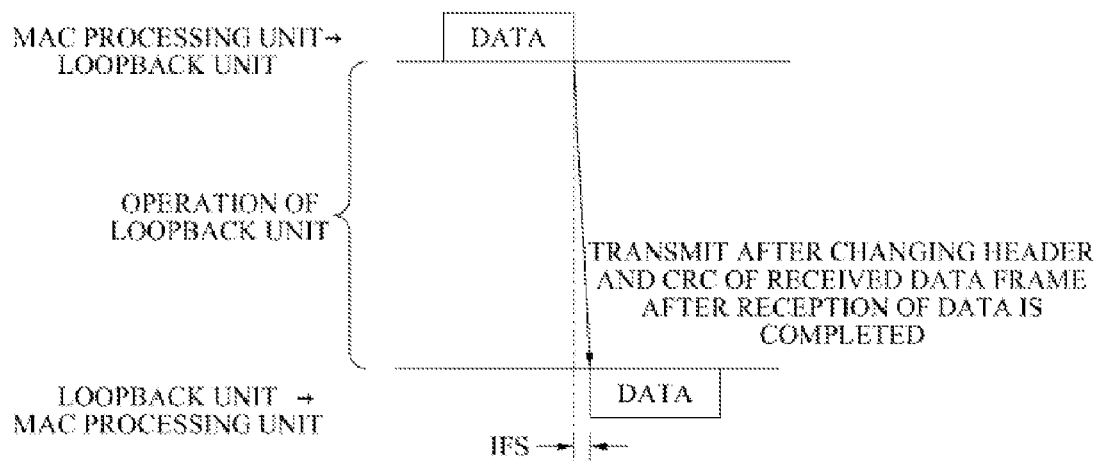
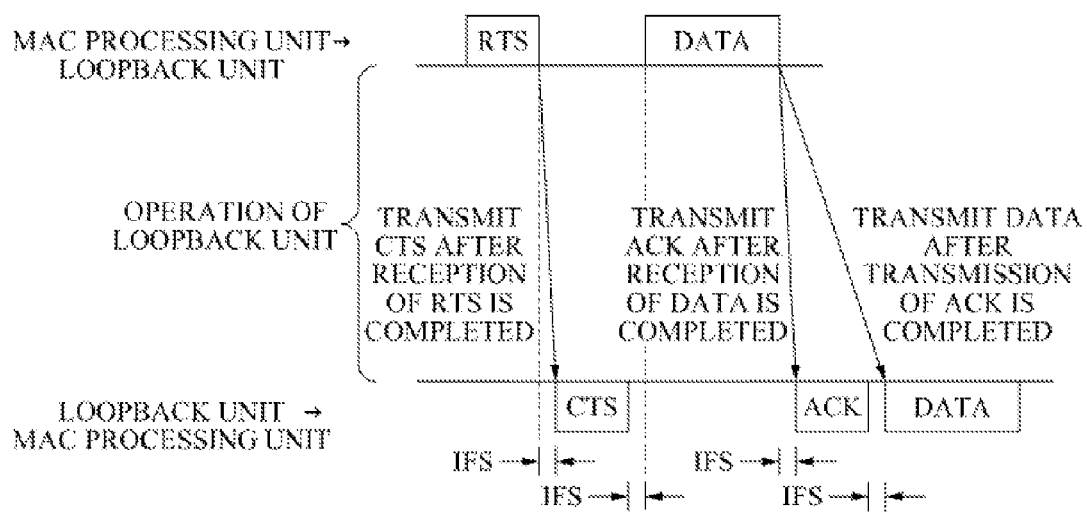

APPARATUS AND METHOD FOR LOOP-BACK IN WIRELESS COMMUNICATION SYSTEMS

CROSS-REFERENCES TO RELATED APPLICATIONS

The present application claims priority of Korean Patent Application Nos. 10-2010-0131736 and 10-2011-0058696, filed on Dec. 21, 2010 and Jun. 16, 2011, respectively, which are incorporated herein by reference in their entireties.

BACKGROUND OF THE INVENTION

1. Field of the Invention

Exemplary embodiments of the present invention relate to an apparatus and a method for loop-back in wireless communication systems, and more particularly, to an apparatus and a method for loop-back data to be transmitted to a medium access layer between a medium access layer and a physical layer in wireless communication systems.

2. Description of Related Art

Generally, a loop-back scheme for returning original data to a sender without transmitting the data to a receipt by feedbacking the data to a transmitting apparatus without transmitting the data from the transmitting apparatus transmitting the data to a receiving apparatus in a communication system has been prevalently used. The loop-back scheme has been used as various purposes. However, the most important purpose of the loop-back scheme is to verify integrity of a communication path that is being currently used.

For example, in a wired network such as an asynchronous transfer mode (hereinafter, referred to as "ATM") or Ethernet, the loop-back uses a line loop-back method of connecting a cable line that is a channel transmitting data from a physical layer (PHY) to a receiving unit of the sender transmitting data rather than an opponent receipt receiving the data. As another loop-back scheme, there is a scheme of loop-backing the data to be transmitted between the medium access layer (hereinafter, referred to as "MAC") of the sender and the physical layer without performing a handover to the physical layer and allowing the receiving unit of the MAC to receive the data, or the like.

However, unlike the wired network, it is difficult to adopt loop-back technologies of the wired network as they are due to characteristics of the wireless communication systems to be accessed to a shared medium called the wireless channel. In particular, unlike a carrier sensing multiple access/collision detection (hereinafter, referred to as "CSMA/CD" of wired Ethernet) scheme, the wireless access network of Institute of Electrical and Electronics Engineers 802.11 (IEEE 802.11) based wireless access network uses a carrier sensing multiple access/collision avoidance (CSMA/CA) method and thus, it is difficult to adopt a loop-back technology as it is in the existing wired Ethernet.

For example, in the wired Ethernet, detecting a carrier and then, immediately transmitting data when the wired channel is empty and confirming whether the data originally reach the receipt are considered that the data are originally transmitted to a receipt when collision does not occur through collision detection (CD). On the other hand, in the 802.11 based wireless access technology, a sender secures the shared wireless channel and then, transmits data to be transmitted through a process of first transmitting a control frame to the receipt after sensing the carrier and allowing a receipt to transmit a response control frame thereto to a sender.

In addition, in the 802.11 based wireless access technology, unlike the wired Ethernet depending on the collision detection, confirming whether the data originally reach the receipt transmits the control frame having a meaning that the receipt receives the data well to the sender and the sender determines that the data reach the receipt as they are only when the sender receives the control frame as it is.

Therefore, in the 802.11 based wireless access technology, when implementing the loop-back function, like the wired Ethernet, when all the frames transmitted by the sender are loop-backed as they are, two problems may occur as follows. First, the sender transmits the control frames to be transmitted before transmitting data. This waits for the response frame of the receipt to the control frame transmitted by the sender so as to allow the sender to transmit the data when the control frames are simply loopbacked to the sender. However, the sender cannot permanently receive the response frame of the receipt since the control frame transmitted by the sender are loopbacked and thus, are not transmitted to the receipt, thereby failing to secure the wireless channel.

Second, when simply loop-backing the data transmitted by the sender that the receipt is expected to transmit the receive acknowledgement ACK to the sender, the data transmitted by the sender are loop-backed and thus, the sender does not permanently receive the ACK message to the data transmitted by the sender. Therefore, the normal data transmission is considered as being failed.

Accordingly, in the 802.11 based wireless communication systems, since the share wireless channel access method is different from the existing wired network, it is impossible to apply the existing loop-back technology as it is. Therefore, a need exists for a new loop-back method considering unique characteristics of the wireless communication systems.

SUMMARY OF THE INVENTION

An embodiment of the present invention is direct to an apparatus and a method for loop-back capable of verifying integrity of a communication path in wireless communication systems.

Another embodiment of the present invention is directed to an apparatus and a method for loop-back capable of reflecting characteristics in wireless communication.

Still another embodiment of the present invention is directed to an apparatus and a method for loop-back capable of being implemented without an additional memory.

In accordance with an embodiment of the present invention, a loop-back apparatus in wireless communication systems includes: an MAC processing unit configured to transmit a user data and a control frame when a loop-back mode is established; and a loop-back unit configured to generate a response frame of a receipt for the user data and the control message transmitted from the MAC processing unit and again feedbacks the generated response frame to the MAC processing unit.

In accordance with another embodiment of the present invention, a loop-back method in wireless communication systems includes: transmitting a CTS signal after predetermined time lapses, as a response to an RTS signal when the RTS signal is received due to a need of a channel securing process; receiving data after the CTS signal is transmitted; transmitting a response to the received data; and transmitting loop-back data changing a header and a CRC corresponding to the data after the transmission of the response ends.

In accordance with still another embodiment of the present invention, a loop-back method in wireless communication systems includes: transmitting a CTS signal after predetermined time lapses, as a response to an RTS signal when the RTS signal is received due to a need of a connection establishment; receiving data after the CTS signal is transmitted; transmitting loop-back data changing a header and a CRC corresponding to the data for the received data after predetermined time lapses; and transmitting a response message to the data after the transmission of the loop-back data is completed.

BRIEF DESCRIPTION OF THE DRAWINGS

FIG. 3 is a conceptual diagram showing an operation process of a loop-back unit for transmitting a data frame not including the transmission or reception of a control frame in accordance with an embodiment of the present invention.

FIG. 4 is a conceptual diagram showing an operation process of a loop-back unit for transmitting a data frame including the transmission or reception of a control frame in accordance with an embodiment of the present invention.

DESCRIPTION OF SPECIFIC EMBODIMENTS

Figure 1:
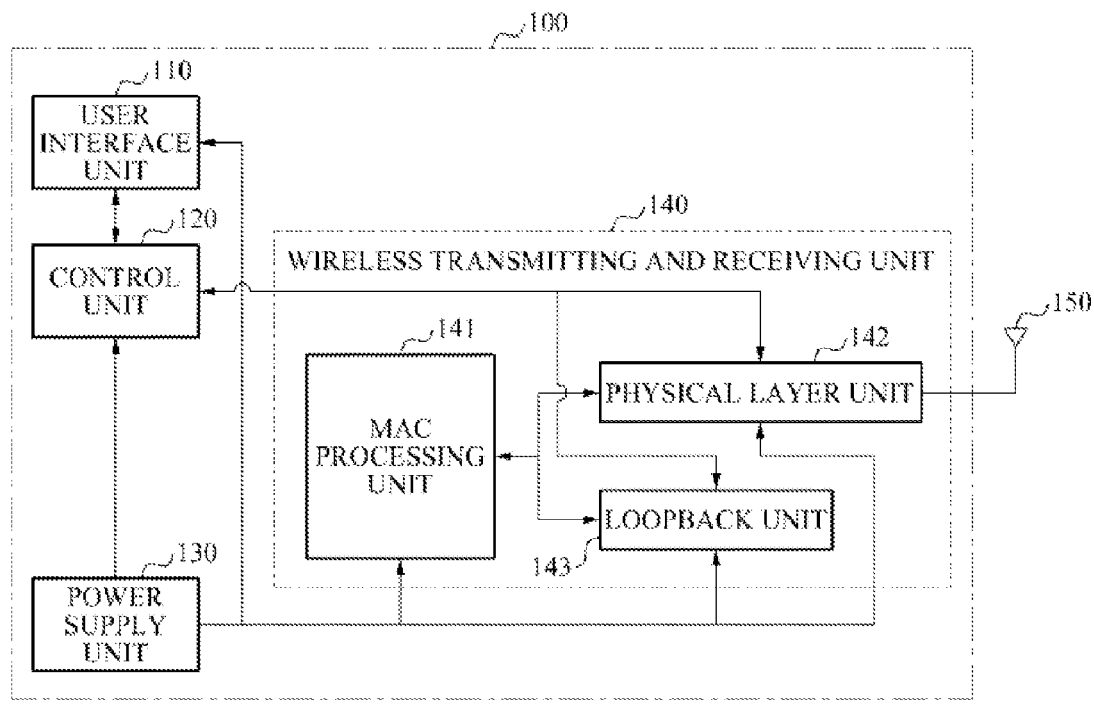
FIG. 1 is a configuration diagram of a loop-back apparatus in wireless communication systems in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

Hereinafter, embodiments of the present invention will be described in detail with reference to the accompanying drawings.

FIG. 1 is a configuration diagram of a loop-back apparatus in wireless communication systems in accordance with an embodiment of the present invention.

A loop-back apparatus 100 in the wireless communication systems of FIG. 1 may be configured to include a user interface unit 110, a control unit 120, a power supply unit 130, a wireless transmitting and receiving unit 140, and a transmitting and receiving antenna 150. Further, the wireless transmitting and receiving unit 140 is configured to include an MAC processing unit 141, a physical layer unit 142, and a loop-back unit 143.

The user interface unit 110 receives various inputs from a user or finally provides information to the user. The user interface unit 110 may be configured by devices enabling a user to input and output information, such as a liquid crystal device, a keypad, a microphone, a speaker, or the like, and may include an interface allowing a user to enable or disable a loop-back function.

The control unit 120 is connected with the user interface unit 110 and is mounted with various application programs for a user. In addition, the control unit 120 matches the wireless transmitting and receiving unit 140 to perform a control so as to transmit and receive data provided by user application programs through the wireless transmitting and receiving unit 140. Further, the control unit 120 may be configured to include separate application programs or utilities processing the enable/disable signal of the loop-back so as to allow a user to receive the enable/disable signal of the loop-back input from the user interface unit 110 and transmit the received enable/disable signal to the wireless transmitting and receiving unit 140. In addition, the power supply unit 130, which is a power supply apparatus including a battery, supplies power to all the components of the entire loop-back apparatus 100.

The wireless transmitting and receiving unit 140 modulates the data transmitted from the control unit 120 into a wireless RF signal and transmits the modulated wireless RF signal to a wireless channel or receives the wireless RF signal received from the wireless channel and demodulates the received RF signal and is then transmitted to the control unit 120. The MAC processing unit 141 of the wireless transmitting and receiving unit 140 matches the control unit 120 to transmit and receive the user data and the control data and performs a core medium access control (MAC) function such as system access, bandwidth allocation request, connection establishment, connection management, or the like. In particular, the MAC processing unit 141 performs a function of entering a loop-back mode when the loop-back function related to the loop-back function is established or exiting from the loop-back mode when the loop-back function is disabled and then, being operated at a normal operation mode. That is, the MAC processing unit 141 generates and transfers the loop-back signal when the loop-back function is established by a user or a system and is operated as an original MAC function when the loop-back function is disabled.

The physical layer unit 142 of the wireless transmitting and receiving unit 140 matches an MAC processing unit 141 to perform channel coding and modulation on the data transmitted from the MAC processing unit 141 so as to adapt to the wireless channel environment and transmit the channel coded and modulated data to the wireless channel as the wireless RF signal or receives, demodulates, and decodes the wireless RF signal received from the wireless channel and transmits the demodulated and decoded wireless RF signal to the MAC processing unit 141. However, when the loop-back function is established, the physical layer unit 142 is shifted to an inactive state in which the data are not transmitted.

The loop-back unit 143 of the wireless transmitting and receiving unit 140 is activated when the loop-back function is established, such that the MAC processing unit 141 performs the loop-back function that receives the data and the control frame transmitted through the wireless environment to appropriately change the corresponding data and control frame or generate the response frame appropriate for the corresponding data and control frame and again return the data and the frame to the MAC processing unit 141, as if the receiver receives the corresponding data and control frame and then transmits the corresponding data and control frame again. Hereinafter, the embodiment of the present invention will be described under the assumption that one data frame includes a management frame.

Figure 2:
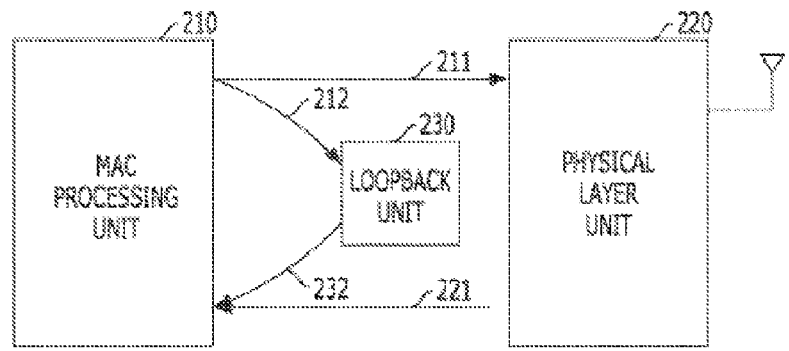
FIG. 2 is a conceptual diagram illustrating a loop-back point and a loop-back direction in accordance with an embodiment of the present invention.

FIG. 2 is a conceptual diagram illustrating a loop-back point and a loop-back direction in accordance with an embodiment of the present invention.

The physical layer unit 220 receives a data, control, or management frame transmitted by the MAC processing unit through a transmitting path 211 between the MAC processing unit 210 and the physical layer unit 220 at a normal operation mode in which the loop-back function is not established and transmits the frame to the wireless channel. On the other hand, the physical layer unit 220 transmits the received data, control, or management frame to the MAC processing unit through a receiving path 221 between the physical layer unit 220 and the MAC processing unit 210.

However, when the loop-back function is established, the MAC processing unit 210 transmits the data, control, or management frame to be transmitted to a loop-back unit 230 through a transmitting path 212 between the MAC processing unit 210 and the loop-back unit 230. The loop-back unit 230 performs the loop-back function of appropriately changing the received frame or generating the response frame appropriate for the corresponding data and the control frame and again returning the frames to the MAC processing unit 210 through the receiving path 232 between the loop-back unit 230 and the MAC processing unit 210.

The two transmitting paths 211 and 212 are a path that is demultiplexed according to the enable and disable of the loop-back function and the two receiving paths 221 and 232 are a path that is multiplexed by the MAC processing unit according to the enable and disable of the loop-back function.

FIG. 3 is a conceptual diagram showing an operation process of a loop-back unit for transmitting a data frame not including the transmission or reception of a control frame in accordance with an embodiment of the present invention.

A method of the loop-back unit that performs the loop-back operation on the transmission of the data frame not including the transmission or reception of the control frame in the 802.11 based system will be described with reference to FIG. 3.

When the loop-back function is established by the user or the system, all the frames transmitted from the MAC processing unit 210 are transmitted to the loop-back unit 230 through the transmitting path 212 between the MAC processing unit 210 and the loop-back unit 230.

FIG. 3 shows the operation of the loop-back unit 230 when the frame transmitted to the loop-back unit 230 is the transmission of the data frame not including the transmission or reception of the control frame. That is, the data frame is immediately transmitted without exchanging request to send (RTS)/clear to send (CTS). In this case, when an ACK policy of the data frame is No Ack, the frame exchange sequence does not include the transmission or reception of any control frame.

In addition, the loop-back unit 230 changes a header and CRC of the data frame received immediately after the data is received and then, transmits the changed header and CRC to the MAC processing unit 210 after predetermined time lapses. In this case, the predetermined time, is an inter-frame space (hereinafter, referred to as "IFS"), may be IFS defined in the 802.11 standard and may be a time delay in which the MAC processing user unit is in a receiving enable state.

The loop-back unit 230 corrects the received data frame so as to match the header of the frame with the loop-back function without transmitting the received data frame to the MAC processing unit 210 as it is. Further, the loop-back unit 230 again generates the CRC that protects the header and payload of the frame. The header correction of the frame is made so as not to be filtered due to the wrong header in the MAC processing unit 210 when the loop-backed frame is loop-backed to the MAC processing unit.

As the corrected contents, a swap of a transmitting MAC address and a receiving MAC address, a swap or correction of To DS (Distribution System) and From D of a frame control field, correction of receiver duration/ID field, correction of a QoS control field, or the like, may be made.

FIG. 4 is a conceptual diagram showing an operation process of a loop-back unit for transmitting a data frame including the transmission or reception of a control frame in accordance with an embodiment of the present invention.

How the loop-back unit performs the loop-back operation on the transmission of the data frame including the transmission or reception of the control frame in the 802.11 based system will be described with reference to FIG. 4. In FIG. 4, after the Request To Send (RTS)/Clear To Send (CTS) is swapped, the data frame is transmitted. In this case, FIG. 4 shows the process in which the loop-back operation is performed so as to meet the frame exchange sequence when the Ack Policy of the data frame is the normal ACK.

In the 802.11 based system, the case in which the RTS is first transmitted prior to the data transmission is the case in which the length of the data frame is larger than an RTS threshold, the case in which Tx opportunity (referred to as "TXOP") is obtained, the case in which the protection function is needed, or the like. If the RTS frame does not need to transmit before the data frame to be transmitted, the swap of the RTS/CTS frame is omitted in FIG. 4.

The MAC processing unit 210 first transmits the RTS frame before the data frame is transmitted. The loop-back unit 230 receiving the RTS frame generates the CTS frame to be received by the MAC processing unit 210 based on the information included in the received RTS frame. Thereafter, the loop-back unit 230 transmits the CTS frame to the MAC processing unit 210 after predetermined time lapses. In this case, the predetermined time, is an inter-frame space (hereinafter, referred to as "IFS"), may be IFS defined in the 802.11 standard and may be a time delay in which the MAC processing user unit is in a receiving enable state.

The loop-back unit 230 generates the CTS frame to be received by the MAC processing unit 210 based on the information included in the received RTS frame. In this case, the CRC is finally generated, including the generated information that includes one using a transmitter address (TA) address as a receipt address of the CTS, the swap or correction of To DS and From DS of the frame control field, and the correction of the duration/ID field.

In FIG. 4, after the RTS frame is transmitted, the MAC processing unit 210 receiving the CTS frame from the loop-back unit 230 transmits the data frame to be transmitted. In this case, when the ACK policy of the data frame is the No ACK, the operation of the following loop-back unit 230 is shown in FIG. 3. However, when the ACK policy of the data frame is a Normal Ack and the MAC processing unit 210 is operated only in the case that the MAC processing unit 210 necessarily keeps the frame exchange sequence, the loop-back unit 230 generates the ACK frame to be received by the MAC processing unit 210 based on the header information of the received data frame and transmits the generated ACK frame to the MAC processing unit 210.

The loop-back unit 230 finally generates the CRC, including the information generating the ACK frame that includes one using a transmitter address (TA) address of the data frame as a receipt address (RA) of the ACK frame, the swap or correction of To DS and From DS of the frame control field, and the correction of the duration/ID field.

The MAC processing unit 210 receiving the ACK frame determines that the data frame transmitted by the MAC processing unit 210 accurately reaches the receipt. Therefore, it is possible to prevent the data frame from being retransmitted due to the non-reception of the ACK frame. Further, the loop-back unit 230 transmitting the ACK frame changes the header and the CRC received after the predetermined time lapses and then, transmits the changed data frame to the MAC processing unit 210. In this case, the predetermined time, is an inter-frame space (hereinafter, referred to as "IFS"), may be IFS defined in the 802.11 based standard and may be a time delay in which the MAC processing user unit is in a receiving enable state. The method of correcting the header of the data frame by the loop-back unit 230 is the same as the method in FIG. 3.

In FIG. 4, after the loop-back unit 230 transmits the ACK frame to the MAC processing unit 210, the loop-back unit 230 can loop-back the data frame and thus, the data frame needs to be stored in the loop-back unit 230. Therefore, the MAC processing unit 210 can be operated only in the case that the MAC processing unit 210 necessarily keeps the frame exchange sequence. In addition, in order to store the data frame, the loop-back unit 230 requires a memory. In this case, considering that an MAC service data unit (MSDU) is a maximum of 2304 bytes, the loop-back unit 230 requires a minimum of 2 Kbytes or more.

However, if the MAC processing unit 210 can be operated even when the MAC processing unit 210 does not necessarily keep the frame exchange sequence, the MAC processing unit 210 can implement the loop-back function without storing the data frame. That is, if the MAC processing unit 210 can be operated even when the MAC processing unit 210 does not necessarily keep the frame exchange sequence, the MAC processing unit 210 can be implemented.

Figure 5:
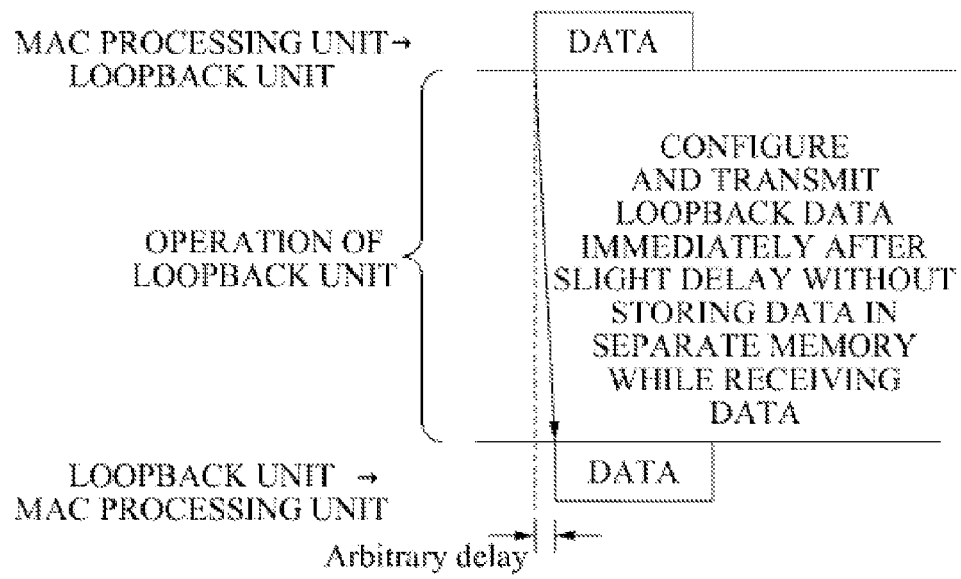
FIG. 5 is a conceptual diagram illustrating an operation method of a loop-back unit without a memory in accordance with another embodiment of the present invention.

FIG. 5 is a conceptual diagram illustrating an operation method of a loop-back unit without a memory in accordance with another embodiment of the present invention.

Referring to FIG. 5, when the frame transferred to the loop-back unit 230 without the memory is the transmission of the data frame not including the transmission or reception of the control frame, the operation method of the loop-back unit 230 will be described below.

In FIG. 5, the data frame is immediately transmitted without swapping the RTS/CTS. In this case, when the ACK policy of the data frame is the No ACK, the frame exchange sequence does not include the exchange of the control frame. In this case, the operation of the loop-back unit 230 without the memory is shown.

As compared with FIG. 3, as the most prominent characteristics, in FIG. 5, the loop-back unit 230 starts to generate the data frame to be transmitted to the MAC processing unit 210 after appropriately correcting the header of the frame as described in FIG. 3 immediately after obtaining the information necessary for the loop-back from the header before the reception of the data frame ends and immediately transmits the generated data frame to the MAC processing unit 210. Therefore, the loop-back unit 230 can implement the loop-back of the data frame by using several registers without needing the separate memory.

When the ACK policy of the data frame is the normal ACK, the MAC processing unit 210 transmits the data frame and then, waits for the reception of the ACK frame therefor. Therefore, even when the MAC processing unit 210 does not necessarily keep the frame exchange sequence, the operation of the MAC processing unit 210 can be implemented and thus, the loop-back unit 230 can perform the operation of the loop-back without the memory.

Figure 6:
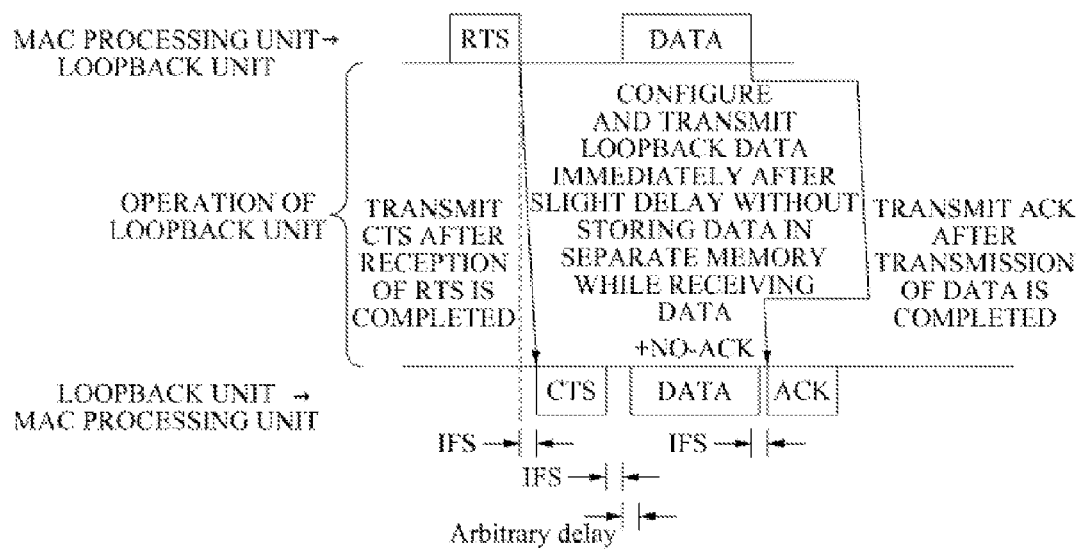
FIG. 6 is a conceptual diagram of a method for allowing a loop-back unit without a memory in accordance with another embodiment of the present invention to perform a loop-back operation for transmitting a data frame including transmission or reception of a control frame.

FIG. 6 is a conceptual diagram of a method for allowing a loop-back unit without a memory in accordance with another embodiment of the present invention to perform a loop-back operation for transmitting a data frame including transmission or reception of a control frame.

Referring to FIG. 6, when the frame transferred to the loop-back unit 230 is the transmission of the data frame including the transmission or reception of the control frame, the operation of the loop-back unit 230 without the memory will be described below.

When the RTS frame needs to be transmitted before the data frame is transmitted, the loop-back unit 230 receiving the RTS frame as described in FIG. 4 generates the CTS frame to be received by the MAC processing unit 210 based on the information included in the received RTS frame and transmits the generated CTS frame to the MAC processing unit 210. If the RTS frame does not need to send before the data frame to be transmitted, the swap of the RTS/CTS frame is omitted in FIG. 6.

After the swap of the RTS/CTS, the MAC processing unit 210 transmits the data frame. In this case, the loop-back unit 230 starts to generate the data frame to be transmitted to the MAC processing unit 210 immediately after obtaining the information necessary for the loop-back from the header before the reception of the data frame ends as described in FIG. 5 and immediately transmits the generated data frame to the MAC processing unit 210. This can operate the MAC processing unit 210 even when the MAC processing unit 210 does not necessarily keep the frame exchange sequence. Therefore, only when the data frame loop-backed by the loop-back unit 230 can complete the transmission of the data frame to the MAC processing unit 210 until the MAC processing unit 210 receives the ACK frame, the MAC processing unit 210 may receive the loop-backed data frame and normally receive the ACK frame generated by the loop-back unit 230.

In this case, as shown in FIG. 4, the loop-back unit 230 finally generates the CRC, including the information generating the ACK frame that includes one using a transmitter address (TA) address of the data frame as a receipt address (RA) of the ACK frame, the swap or correction of To DS and From DS of the frame control field, and the correction of the duration/ID field. Therefore, the loop-back unit 230 operated as shown in FIG. 6 can implement the loop-back of the data frame by using several registers without needing the separate memory.

The loop-back apparatus and method in accordance with the exemplary embodiments of the present invention can again loop-back the data transmitted between the medium access layer and the physical layer to the physical layer in the wireless communication systems to enable the wireless communication systems to verify the integrity of the communication path. In addition, the loop-back apparatus and method in accordance with the exemplary embodiment of the present invention can loop-back the data even in the frame exchange sequence including the transmission or reception of the control frame in consideration of the characteristics of the 802.11 based wireless communication technology. In particular, the loop-back apparatus and method in accordance with the exemplary embodiment of the present invention can implement the loop-back by only the simple logic without using the separate additional memory depending on the characteristics of each of the MAC layers.

While the present invention has been described with respect to the specific embodiments, it will be apparent to those skilled in the art that various changes and modifications may be made without departing from the spirit and scope of the invention as defined in the following claims.

What is claimed is:

1. A loop-back apparatus comprising:
   a medium access control (MAC) processing unit configured to transmit at least one of a user data frame and a control frame to a loop-back unit in a loop-back mode;
   the loop-back unit configured to generate at least one of a response frame for the user data frame and a response frame for the control frame and to feedback, to the MAC processing unit, at least one of the generated response frame for the user data frame and the generated response frame for the control frame; and
   a wireless transceiver configured to generate a wireless signal by converting at least one of a user data frame and a control frame received from the MAC processing unit and to transmit the generated wireless signal via a wireless channel.

2. The loop-back apparatus of claim 1,
   wherein the MAC processing unit and the loop-back unit are comprised in a wireless transmitting and receiving unit of the loop-back apparatus, and
   the wireless transceiver comprises a wireless antenna and a physical layer unit to perform the conversion to generate the wireless signal in a non-loop-back mode.

3. The loop-back apparatus of claim 1, wherein the user data frame and the control frame transmitted to the loop-back unit are generated according to Institute of Electrical and Electronics Engineers (IEEE) 802.11 protocols.

4. The loop-back apparatus of claim 1, wherein a frame format of the user data frame transmitted to the loop-back unit is identical to a frame format of the user data frame transmitted to the transmitter.

5. The loop-back apparatus of claim 1, wherein the wireless transceiver is configured to receive a response wireless signal, the response wireless signal being responsive to the wireless signal transmitted by the wireless transceiver, to convert the received response wireless signal into at least one of a response data frame and a response control frame, and to transmit the at least one of the response data frame and the response control frame to the MAC processing unit.

6. The loop-back apparatus of claim 5, wherein a frame format of the response data frame transmitted from the wireless transceiver to the MAC processing unit is identical to a frame format of the response frame for the user data frame generated by the loop-back unit.

7. The loop-back apparatus of claim 5, wherein a frame format of the response control frame transmitted from the wireless transceiver to the MAC processing unit is identical to a frame format of the response frame for the control frame generated by the loop-back unit.

8. The loop-back apparatus of claim 7, wherein the frame format of the response control frame transmitted from the wireless transceiver to the MAC processing unit and the frame format of the response frame for the control frame generated by the loop-back unit are Clear to Send (CTS) frame formats in accordance with Institute of Electrical and Electronics Engineers (IEEE) 802.11 protocols.

9. The loop-back apparatus of claim 5, wherein the loop-back unit is configured to adjust a response timing of the response frame for the control frame according to an expected response timing of the response control frame.

10. The loop-back apparatus of claim 1, wherein the response frame for the user data frame comprises a header modified from a header of the user data frame received from the MAC processing unit.

11. The loop-back apparatus of claim 1, wherein the response frame for the control frame comprises a field modified from a field of the control frame received from the MAC processing unit.

12. The loop-back apparatus of claim 11, wherein the response frame for the control frame has a Clear to Send (CTS) frame format in accordance with Institute of Electrical and Electronics Engineers (IEEE) 802.11 protocols, and
   the control frame received from the MAC processing unit has a Request to Send (RTS) frame format in accordance with Institute of Electrical and Electronics Engineers (IEEE) 802.11 protocols.

13. The loop-back apparatus of claim 1, wherein the loop-back unit receives the user data frame from the MAC processing unit after transmitting the response frame for the control frame.

14. The loop-back apparatus of claim 1, wherein the response frame for the user data frame comprises a header and cyclic redundancy check (CRC) data different from a header and CRC data of the user data frame, respectively.

15. The loop-back apparatus of claim 1, wherein the response frame for the user data frame comprises at least one of an acknowledgement (ACK) and a response data frame.

16. The loop-back apparatus of claim 1, wherein the loop-back unit transmits data according to a frame exchange sequence of Institute of Electrical and Electronics Engineers (IEEE) 802.11 protocols.

17. A loop-back method in a wireless communication terminal comprising a medium access control (MAC) processing unit and a loop-back unit, the method comprising:
   transmitting, by the loop-back unit, a Clear to Send (CTS) signal to the MAC processing unit after a predetermined time lapses, as a response to a Request to Send (RTS) signal if the RTS signal is received from the MAC processing unit in a loop-back mode for a channel securing process;
   receiving data from the MAC processing unit after the CTS signal is transmitted;
   transmitting, to the MAC processing unit, a response responsive to the received data; and
   transmitting, to the MAC processing unit, loop-back data by changing a header and a cyclic redundancy check (CRC) corresponding to the data after the transmission of the response ends.

18. The loop-back method of claim 17, further comprising:
   transmitting the loop-back data by changing the header and CRC of the data as the response to the data after the predetermined time lapses after the reception of the data is completed when the channel securing process is not required.

19. A loop-back method in a wireless communication terminal comprising a medium access control (MAC) processing unit and a loop-back unit, the method comprising:
   transmitting, by the loop-back unit, a Clear to Send (CTS) signal to the MAC processing unit after a predetermined time lapses, as a response to a Request to Send (RTS) signal if the RTS signal is received from the MAC processing unit in a loop-back mode for a connection establishment;
   receiving data from the MAC processing unit after the CTS signal is transmitted;
   transmitting, to the MAC processing unit, loop-back data by changing a header and a cyclic redundancy check (CRC) corresponding to the received data after a predetermined time lapses; and transmitting, to the MAC processing unit, a response message responsive to the data after the transmission of the loop-back data is completed.

20. The loop-back method of claim 19, further comprising:
transmitting the loop-back data by changing the header and CRC of the data as the response to the data after the predetermined time lapses by receiving the data when the connection establishment is not required.

\* \* \* \* \*